United States Patent

Tresp et al.

[11] Patent Number: 5,806,053
[45] Date of Patent: Sep. 8, 1998

[54] METHOD FOR TRAINING A NEURAL NETWORK WITH THE NON-DETERMINISTIC BEHAVIOR OF A TECHNICAL SYSTEM

[75] Inventors: Volker Tresp; Reimar Hofmann, both of Munich, Germany

[73] Assignee: Siemens Aktiengesellschaft, Munich, Germany

[21] Appl. No.: 705,834

[22] Filed: Aug. 30, 1996

[30] Foreign Application Priority Data

Aug. 30, 1995 [DE] Germany ................ 195 31 967.2

[51] Int. Cl.$^6$ .................................................. G06F 15/18
[52] U.S. Cl. ............................ 706/23; 706/22; 706/23; 706/25
[58] Field of Search ........................ 395/22, 23, 24, 395/21, 11

[56] References Cited

U.S. PATENT DOCUMENTS

| 5,159,660 | 10/1992 | Lu et al. ................................. 395/22 |
| 5,396,415 | 3/1995 | Konar et al. .......................... 364/162 |
| 5,600,753 | 2/1997 | Iso ......................................... 395/2.09 |
| 5,649,064 | 7/1997 | Jorgensen et al. .................... 395/22 |

FOREIGN PATENT DOCUMENTS 41 38 053   5/1993   Germany .

OTHER PUBLICATIONS

Xianzhong Cui, and Kang G. shin, "Direct Control and Coordination Using Neural Networks" IEEE Transactions on Systems, Man, and Cybernetics, vol. 23, Issue 3, May 1993.

Shynk et al.; "A Stochastic training model for perception algorithms", IJCNN–91–Seattle; pp. 779–784 vol. 1, Jul. 1991.

"Direct Control and Coordination Using Neural Networks," Cui et al, IEEE Trans. on Systems, Man and Cybernetics, vol. 23, No. 3, May/Jun. 1993, pp. 686–697.

Primary Examiner—Allen R. MacDonald
Assistant Examiner—Jagdish Patel
Attorney, Agent, or Firm—Hill & Simpson

[57] ABSTRACT

In a method for tranining a neural network with the non-deterministic behavior of a technical system, weightings for the neurons of the neural network are set during the training using a cost function. The cost function evaluates a beneficial system behavior of the technical system to be modeled, and thereby intensifies or increases the weighting settings which contribute to the beneficial system behavior, and attenuates or minimizes weightings which produce a non-beneficial behavior. Arbitrary or random disturbances are generated by disturbing the manipulated variable with noise having a known noise distribution, these random disturbances significantly faciliating the mathematical processing of the weightings which are set, because the terms required for that purpose are simplified. The correct weighting setting for the neural network is thus found on the basis of a statistical method and the application of a cost function to the values emitted by the technical system or its model.

7 Claims, 1 Drawing Sheet

METHOD FOR TRAINING A NEURAL NETWORK WITH THE NON-DETERMINISTIC BEHAVIOR OF A TECHNICAL SYSTEM

BACKGROUND OF THE INVENTION

Field of the Invention

The present invention is directed to a method for neural modeling of dynamic processes, with the goal of training the neural network to be able to control processes having a high proportion of stochastic events.

Description of the Prior Art

Neural networks are being introduced into a large variety of technical fields. Neural networks prove especially suitable wherever it is important to derive decisions from complex technical relationships and from inadequate information. For forming one or more output quantities, one or more input quantities, for example, are supplied to the neural network. To this end, such a network is first trained for the specific application, is subsequently generalized, and is then validated with data differing from the training data. Neural networks prove especially suitable for many applications since they can be universally trained.

A problem that often arises in conjunction with the use of neural networks, however, is that the input data for the training or during operation of the network are often not complete. This situation, as well as the fact that the measured values which are supplied to the neural network for constructing a time series are often imprecise or noise-infested, can cause degraded training results of the networks. In the case of processes having a high proportion of stochastic events, a particular problem is that the training data have random character, and heretofore a suitable method does not exist to train neural networks with the behavior of such systems.

SUMMARY OF THE INVENTION

It is an object of the present invention to provide a training method for improving the learning process of a neural network during training thereof, which is capable of training the neural network to the behavior of a technical system having a high proportion of stochastic events.

This object is achieved in accordance with the principles of the present invention in a method for training a neural network using training data having weightings which are set during the training using a cost function. The cost function evaluates a beneficial system behavior of the technical system to be modeled, and thereby intensifies or increases the weighting settings which contribute to the beneficial system behavior, and attenuates or minimizes weightings which produce a non-beneficial behavior. Arbitrary or random disturbances are generated by disturbing the manipulated variable with noise having a known noise distribution, these random disturbances significantly faciliating the mathematical processing of the weightings which are set, because the terms required for that purpose are simplified. The correct weighting setting for the neural network is thus found on the basis of a statistical method and the application of a cost function to the values emitted by the technical system or its model.

Neural networks can be advantageously trained with the behavior of technical systems that have substantially completely stochastic behavior with this method, because the inventive method makes use of statistical methods for evaluating the input data when training the neural network. The manipulated variable data are varied for this purpose using noise having a known statistical distribution for generating a new controlled variable of the technical system. By frequent repetition of this procedure, and an evaluation of the controlled variable of the technical system on the basis of the cost function, weightings which achieve an improvement in the behavior of the technical system relative to a desired reference behavior are more heavily weighted using the cost function, so that an optimum weighting setting of the neural network can be achieved. Known methods for training neural networks can be employed for setting the weightings with reference to error gradients.

The number of time series to be registered for training the neural network can be varied, thereby providing the operator with the possibility of influencing the precision of the setting of the weightings of the neural network dependent on the calculating time or calculating capacity available to the operator.

A number of time series can be acquired by modeling, or by employing the real technical system itself, and their averages can then be employed for training the neural network, since a better statistical basis for the accuracy of the training values is thereby achieved.

A Gaussian distribution can be employed as the known noise distribution for varying the manipulated variable when training the neural network, since the error gradient for training the neural network can thus be calculated in a particularly simple manner.

A number of time series can be simulated and measured, since conclusions about the behavior of the manipulated variable of the technical system thus can be obtained under various conditions, and the statistics of the time series are thereby improved. An advantage of the inventive method is that not only can the manipulated variable be superimposed with noise having a known distribution, but also the controlled variable can be superimposed with noise having a known distribution, without degrading the learning behavior of the neural network.

The inventive method operates equally as well with the technical system itself, or using a model of the technical system. For simplicity, therefore, as used herein the term "technical system" will be understood as meaning the technical system itself or a model of the technical system.

DESCRIPTION OF THE PREFERRED EMBODIMENTS

Figure 1:
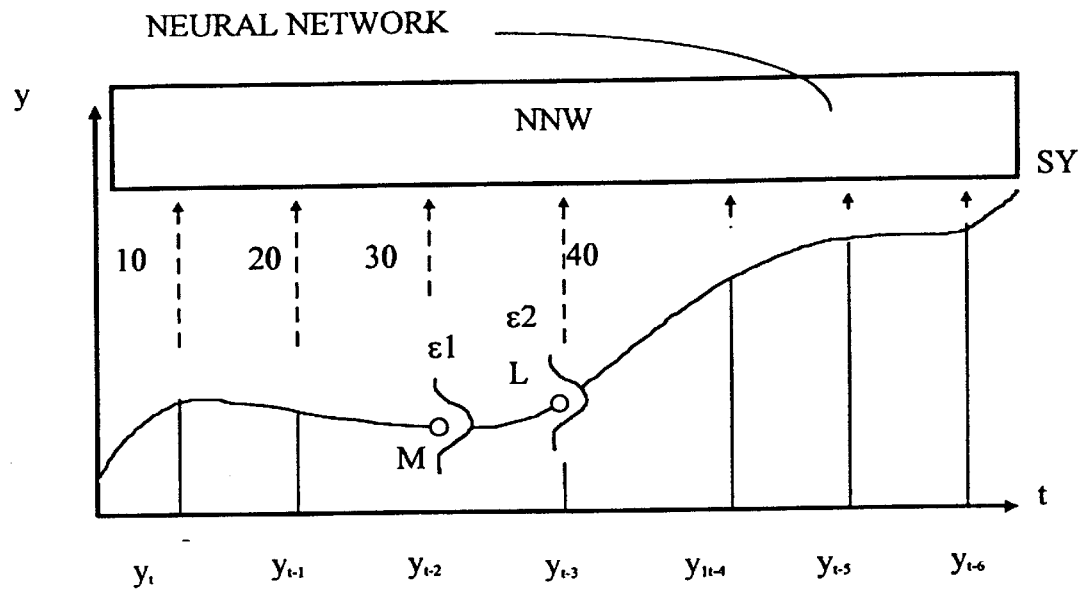
FIG. 1 shows a time series and a system behavior in accordance with the inventive method.

FIG. 1 shows a time series of measured values that, for example, can be supplied to a neural network. The explanation associated with FIG. 1 illustrates the basic mathematical principles underlying the inventive method. In chronological succession, these measured values, are acquired, for example, from a technical system and are referenced as $y_t$ through $y_{t-6}$ according to their chronological succession. For example, it is assumed in FIG. 1 that the value $y_{t-2}$ is missing. The relevant values in the Markov blanket, as neighboring values of this missing measured value, are $y_{t-4}$, $y_{t-3}$, $y_{t-1}$ and y. Such a missing measured value in a time series can, for example, arise because the measuring instrument for registering the values did not function at the point in time in question or, in order to train the neural network better, it seems beneficial between individual measured values to supply this neural network with a further value that, consequently, is yet to be identified, i.e. that is still to be generated according to the inventive method.

FIG. 1 shows the time series in conjunction with a neural network NNW. It may be seen that y represents a time-dependent variable that represents the system behavior SY of a technical system. As may be seen, the values yHd tthrough $y_{t-6}$ correspond to measured values that are taken from the system behavior SY. The dashed arrows at the respective points in time symbolize that these measured values are to be supplied to the neural network NNW during operation or during training.

As in FIG. 1 as well, the questionable measured value M for the point in time $y_{t-2}$ is not present. The probability density $\epsilon 1$ is indicated for this measured value M. For example, the probability density can be back-calculated according to the inventive method from a predetermined, known error distribution density of the remaining measured values. What is thereby particularly exploited is that the missing measured value must be located between two known measured values and the error thereof is thus also limited by the errors of the neighboring values and the errors of the remaining measured values of the time series. The underlying time series can be described as follows:

$$y_t = f(y_{t-1}, Y_{t-2}, \ldots, Y_{t-N}) + \epsilon 1 \tag{1}$$

wherein the function is either "known to" the neural network such as being stored therein or stored in a memory accessible by the neural network, or is adequately modeled by a neural network. The contribution $\epsilon_t$, denotes an additive, uncorrelated error with the chronological average 0. This error—and this is essential for the inventive method—comprises a known or predetermined probability density $P_\epsilon(\epsilon)$ and typically symbolizes the unmodeled dynamics of the time series. For example, a future value is to be predicted for such a time series that is to be completed according to the inventive method. It should be noted that future values are to be understood as being relative to the time position selected at the moment. This means that for a point in time $y_{t-5}$, the point in time $y_{t-4}$ constitutes its future value. Under these conditions, the conditional probability density can be described as follows for a value of the time series to be predicted:

$$P(y_t|y_{t-1},y_{t-2}, \ldots, y_{t-N}) = P_\epsilon(y - f(y_{t-1},y_{t-2}, \ldots, Y_{t-N})) \tag{2}$$

As already mentioned, the error distribution density must be known. This distribution density can either be calculated on the basis of the system behavior and other known, external quantities, or can be predetermined. A typical error distribution that occurs in practice is the Gaussian distribution. The conditional probability density can be described as follows with such an assumed Gaussian error distribution:

$$P(y_t|y_{t-1},y_{t-2}, \ldots, y_{t-N}) = G(y_t; f(y_{t-1}, \ldots, y_{t-N}), \sigma^2) \tag{3}$$

wherein $G(x; c, \sigma^2)$ is the notation for a normal density that is determined at x and with a center C and a variance $\sigma^2$. When it is assumed that the system to be described is presented in the form of a sequence of values on a time axis, then the individual values of $y_t$ can also be interpreted as random variables in a probabilistic network. The invention is based on the problem of predicting a value of the time series with the existing information from the remaining values being employed as completely as possible. Based on the assumptions that were made above, the entire probability density of the time series can be described as follows:

$$P(y_1, y_2, \ldots, y_t) = P(y_1, \ldots, y_N) \prod_{l=N+1}^{t} P(y_l|y_{l-1}, \ldots, y_{l-N}) \tag{4}$$

It is thereby assumed that $y_{t-k}$, with $k \leq N$, is the missing value. Assuming that $y^u = \{y_{t-k}\}$ and $y^m = \{y_{t-1}, \ldots, y_{t-k-N}\} \backslash \{y_{t-k}\}$ are valid, the anticipated value that is to be predicted in the time series can be described as follows:

$$E(y_t|M_{t-1}) = \int f(y_{t-1}, \ldots, y_{t-k}, \ldots, y_{t-N}) P(y^u|y^m) dy^u \tag{5}$$

wherein $M_{t-1}$ stands for all measurements up to point in time t-1 The above equation is the basic equation for the prediction with missing data. It should be particularly noted that the unknown $y_{t-k}$ is dependent not only on the values of the time series before the point in time t-k but also is dependent on the measurements following t-k. The reason for this is that the variables in $y^m \cup y_1$ form a minimum Markov blanket Of $y_{t-k}$. This minimum Markov blanket is composed of the direct predecessors and the direct successors of a variable and of all direct predecessors of variables of the direct successor. In the example under consideration in FIG. 1, the direct successors are $y_t, \ldots y_{t-k+1}$. The direct predecessors are:

$$y_{t-k-1}, \ldots y_{t-k-N}$$

and the direct predecessors of the successor of the variables are:

$$Y_{t-1}, \ldots Y_{t-k-N+1}.$$

It is known from the theoretical fundamentals that a variable is independent of another variable of this network when the variables within the Markov blanket are known. The required, conditional density is therefore determined from Equation (5) as follows:

$$P(y^u|y^m) \propto P(y_{t-1}|y_{t-2}, \ldots, y_{t-k}), \ldots, y_{t-1-N}) \times$$
$$P(y_{t-2}|y_{t-3}, \ldots, y_{t-k}, \ldots, y_{t-2-N}) \ldots P(y_{t-k}|y_{t-k-1}, \ldots, y_{t-k-N}) \tag{5b}$$

The case of a missing measured value described here can also be expanded to a plurality of missing measured values lying side-by-side without limiting the invention. When this is the case, the one value must first be determined, for example, according to the inventive method on the basis of its neighbors and successors and predecessors and the further value is then determined with this first-determined value. This can continue back and forth until and adequate precision is achieved. The following is valid for this case:

$$y^u \subseteq \{y_{t-1}, y_{t-2}, \ldots, y_{t-n}\} \tag{5c}$$

For all missing values of the time series between the points in time t-1 and t-N, the following is also valid:

$$y^m \subseteq \{y_{t-1}, y_{t-2}, \ldots, y_1\} \tag{5d},$$

which represents the number of all measured values up to point in time t-1. Also valid $$P(y^u | y^m) \alpha P(y_{t-1}, \ldots, y_2, y_1) \tag{5e},$$

the right side in (5e) being obtained from Equation (4). In general, these integrals in the preceding equations for the function f cannot be analytically solved in case this is a nonlinear function. Details for the numerical solution by means of taking Monte Carlo samples are recited in conjunction with FIG. 2.

When a further measured value of the time series is to be simulated, the method provides an iterative approximation of the probability distribution of the lacking values. For example, let the value L for time $y_{t-3}$ be additionally simulated for training the network. The probability density $\epsilon 2$ is obtained for this measured value. This probability density $\epsilon 2$, for example, can be back-calculated from a predetermined, known error distribution density of the remaining, known measured values according to the inventive method. For the approximation of the probability distribution of two sets of missing values L and M, L, for example, is first presumed as known or estimated. The distribution of M is calculated therefrom and a value for M is randomly determined according to this distribution. L is determined subsequently in the same way with this known value M. This procedure is iterated. The sequence of the values determined in this way approximates the common probability distribution of L and M. This iteration procedure is preferably executed until an adequate precision of the values is established or until the network has been trained precisely enough. For more than two missing values, one proceeds analogously. One value is always determined according to the distribution that arises when all other values are assumed as known.

For the case wherein $y_1, \ldots, y_t$ is to represent possible values of the time series, then $y^m \subseteq \{y_1, \ldots, y_t\}$ indicates all measured values and $y^u = \{y_1, \ldots, y_t\} \backslash y^m$ indicate all known values. Let the neural network that models the function f be parameterized, for example, with a set of weightings w. Then the following is valid:

$$f(y_{t-1}, \ldots, y_{t-N}) \approx NNW_w(y_{t-1}, \ldots, y_{t-N})$$

Without limitation of the invention, however, another known parameterizable function approximator can be employed. The logarithmic probability function, also referred to as the log likelihood function, then reads;

$$L = \log\!\int\! P^M(y_t, y_{t-1}, \ldots, Y_2, y_1) dy^u$$

whereby the common probability density is then approximated as $$P^M(y_t, y_{t-1}, \ldots, y_2, y_1) = P^M(y_N, \ldots, y_1) \prod_{l=N+1}^{t} P^M(y_l | y_{l-1}, \ldots, y_{l-N}) \quad (6)$$

and the following relationship is valid for the neural network for the calculation of the error distribution density:

$$P^M(y_l | y_{t-1}, y_{t-2}, \ldots, y_{t-n}) = P_\epsilon(y_t - NN_w(y_{t-1}, y_{t-2}, \ldots, y_{t-N})) \quad (7)$$

For learning with the assistance of back-propagation or other gradient-based learning algorithms, the gradient of the logarithmized probability function is now also required, this derived as:

$$\frac{\partial L}{\partial w} = \sum_{l=N+1}^{t} \int \frac{\partial \log P^M(y_l | y_{l-1}, \ldots, y_{l-N})}{\partial w} P^M(y^{u(l)} | y^m) dy^{u(l)} \quad (8)$$

It should be noted that one proceeds on the basis of known initial conditions for $Y_1, \ldots, y_n$. When a Gaussian distribution for the error distribution is present, it follows therefrom that:

$$\frac{\partial L}{\partial w} \propto \sum_{l=N+1}^{t} \int y_l -$$

$$NNW(y_{l-1}, \ldots, y_{l-N})) \frac{\partial NNW(y_{l-1}, \ldots, y_{l-N})}{\partial w} P^M(y^{u(l)} | y^m) dy^{u(l)}$$

whereby $y^{u(l)} = y^u \cap \{y_{l-N}\}$ represent the missing values for the inputs of the network and (8a) shows that the integral disappears when all $y_1, \ldots y_{1-N}$ are known.

When the measured values are overlaid with an additional noise, the following relationships derive. Again valid, for example, is:

$$y_t = f(y_{t-1}, y_{t-2}, \ldots, y_{t-N}) + \epsilon_t$$

In this version of the invention, however, there is not to be any direct access to $y_t$. Instead, the time series $$z_t = y_t + \delta_t$$

is to be measured. The contribution $\delta_t$ denotes independent noise with an average value 0. Under the condition that $z = \{Z_1 \ldots Z_{t-1}\}$ and $y = \{y_1, \ldots y_1\}$ are valid, the overall probability density derives as:

$$P(y,z) = P(y_N, \ldots, y_1) \prod_{l=N+1}^{t} P(y_l | y_{l-1}, \ldots, y_{l-N}) \sum_{l=1}^{t} P(z_l | y_l) \quad (8b)$$

The calculating rule for the anticipated, next value of the time series can thus be recited $$E(y_t | z) = \int\!\!\int f(y_{t-1}, \ldots, y_{t-n}) P(y_{t-1}, \ldots, y_{t-n} | z) dy_{t-1} \ldots dy_{t-n} \quad (9)$$

The gradient for the probability function for the training can likewise be calculated. When a Gaussian distribution of the noise with $$z = \{z_1 \ldots z_t\}$$

is present, it follows that $$\frac{\partial L}{\partial w} \propto \quad (9a)$$

$$\sum_{l=N+1}^{t} \int (y_l - NNW(y_{l-1}, \ldots, y_{l-N})) \frac{\partial NNW(y_{l-1}, \ldots, y_{l-N})}{\partial w} \times$$

$$P^M(y_l, \ldots, y_{l-N} | z) dy_1 \ldots dy_{l-N}$$

In one version of the inventive method, for example, values that are noise-infested or that cannot be exactly determined are supplied to the neural network. Due to the approximation of the weightings in the neural network, new values of the time series can be determined by the function f that is simulated by the neural network. These new values of the time series are subsequently supplied to the further neural network NNW which determines new values of the time series therefrom, again by simulation of the function f. This iterative procedure is continued until an adequate precision o the values to be determined has been achieved.

The following fundamentals form the basis for the exact determination of missing values using the Monte Carlo method. It should be noted that all solutions here have the form $$\int h(u,m) P(u|m) du \quad (9b)$$

whereby u denotes the set of unknown variables and m denotes the set of known variables. An integral having this form can, for example, be solved by taking random samples of the unknown variables are taken according to P(u|m). For example, these samples are referenced $u^1, \ldots, u^s$. The following relationship for the approximation follows therefrom:

$$\int h(u,m)P(u|m)du \approx \frac{1}{S} \sum_{s=1}^{S} h(u^s,m). \qquad (9c)$$

It should be noted that u in this equation corresponds to the value $y_{t-k}$, which is missing. With this inventive solution, thus, the problem is reduced to taking samples from P(u|m). Whe n only one variable is missing, the problem is thus reduced to taking samples from a one-variable distribution that can be done with the assistance of the sampling-importance-resampling or with other sampling techniques, Bernardo, J. M., Smith, A.F.M. (1994) Bayesian Theory, Wiley & Sons, pp. 349–355.

Figure 2:
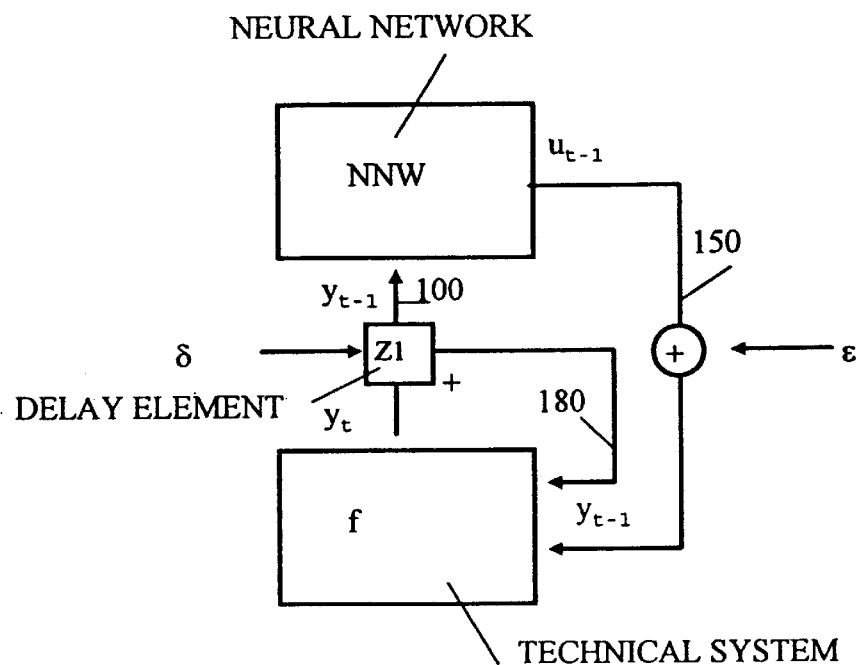
FIG. 2 shows a neural network that is being trained in accordance with the inventive method.

FIG. 2 shows a block circuit diagram for illustrating the inventive method. Here, the neural network NNW is intended to control the technical system f. First, the neural network NNW is shown and, second, the technical system f is shown. The indices t and t-1 are the time dependencies of the values on one another. The index -1 denotes that the value under consideration is located in the time series preceding the value that has the index t. The manipulated variable $u_{t-1}$ is emitted by the neural network NNW as an output to the technical system f via the connecting line 150. In the line 150, this value is superimposed with noise having a known noise distribution $\epsilon$ at an operation point "30 " according to the inventive method. This value $u_{t-1}+\epsilon$ is supplied to the technical system f together with the value $y_{t-1}$. The technical system f reacts to this manipulated variable by generating a controlled variable $y_t$. This controlled variable $y_t$ is supplied to a delay element Z1 that, for example, simultaneously contains an addition function. This delay element Z1, for example, delays the value $y_t$ emitted by the technical system by one time unit in order thus to make the input value available to the technical system via the line 180. Further, this value $y_{t-1}$ is also emitted to the neural network NNW via the line 100. The noise $\delta$ is also shown in FIG. 2; this, for example, can be overlaid on the controlled variable at the linkage point and the delay element Z1. This type of superimposition, however, is not a necessary prerequisite for the functionability of the inventive method.

For example, the system may represent a heating system that images a condition $y_t$ at time t-1 and a control action at time t-1 that is referenced as $u_{t-1}$, for instance turn on, onto a new condition at time t, which is referenced $y_t$. Further, for example, a desired reference behavior $y_{soll}$ is prescribed by a cost function C(y), for instance, $C(y) = (y - y_{soll})^2$. The goal, for example, is to control the system with a neural network NNW such that the costs are minimized. In the distant future, for example, the costs can preferably be more lightly weighted. To this end, for example, a decrementation factor $y^{t-1}$ is introduced, with $0<\gamma<1$. To this end, the parameters of the network NNW, i.e. the weightings thereof, must be correctly set, i.e. trained. This preferably ensues with gradient descent. $U_t$, and $y_t$ may thereby also be vectors; the cost function can also be time-dependent, such as, for example, $C_t(y_t)$. The initial conditions need not be fixed, since non-fixed initial conditions do not represent a problem in the inventive method. In the inventive case, the technical system and the neural network are treated as being non-deterministic. For training the network, the gradient of the costs must preferably be determined according to the weightings. This is recited in equation (11) below.

In the inventive method, the system is preferably simulated or the real system is used and the manipulated variable is superimposed with Gaussian noise. The costs are now random variable and are given by equation (12) below.

The product of the derivation which would occur given a deterministic solution, that is not shown here, thereby disappears. The neural network is now initially initialized with random data, i.e. the weightings are set in a suitable way. Subsequently, the real system is operated with the noise-infested manipulated variables; independently thereof, a model can also be employed and the manipulated variables that the system outputs are observed. A time series is preferably registered from a number of runs of the system. For example, the manipulated variables as well as the controlled variables are thereby logged. Thereupon, this time series is supplied to the neural network in order to learn a beneficial control of the technical system. Due to the predetermined cost function, weighting modifications at the neural network that effect lower costs are thereby promoted, i.e. intensified or less attenuated. When this training procedure is multiply implemented, i.e. when a number of time series were registered and the neural network is trained with these, then a very reliable setting of the weightings of the neural network is achieved. Independently of the cost function that has been presented as an example, other cost functions can also be envisioned. Ultimately, it is important that this cost function achieves an intensification or an attenuation of the weighting factors set at the network with respect to a beneficial system behavior of the technical system.

As a result of the inventive method, a setting of the weightings at the neural network that effects a beneficial referenced behavior of the technical system can be found in this way by means of statistical distribution of the time series with randomly disturbed manipulated variables.

FIG. 2 explains an example of the inventive method further with reference to a block circuit diagram. According to this example, let a time series having the form $$y_t = f(y_{t-1}, u_{t-1}) = \delta_t$$

be established with $$u = NNW(y_t) = \epsilon_t \qquad (10b)$$

and

T = interval width for achieving the reference condition.

According to the inventive method, the neural network is now to be trained such, in that the weightings to be set are selected such at the neurons that the anticipated costs to be evaluated according to a cost function are minimized within the interval T. These can be generally presented as $$\partial E(\cos t) \propto \int \sum_{l=1}^{T} \gamma^{l-1} C(y_l) P(y_1, \ldots, y_T) dy_1, \ldots, dy_T$$

wherein $\gamma \leq 1$ is a decrementation factor for future values of the time series.

The expression $$P(y_1, \ldots, y_T) = P(y_1) \prod_{l=2}^{T} p(y_l|y_{l-1})$$

is the probability for the appearance of specific values within the time series

In order to optimize the control behavior of the neural network, the gradient of the anticipated costs is first formed according to the weightings of the neural network in the inventive method:

$$\frac{\partial E(\cos t)}{\partial w} \propto \sum_{l=2}^{T} \int \gamma^{l-1} C(y_l) \times \left[ \sum_{m=2}^{l} \frac{\partial f(y_{m-1}, u_{m-1})}{\partial u_{m-1}} \frac{NNW(y_{m-1})}{\partial w} (y_m - f(y_{m-1} - u_{m-1})) \right] P(y_1, \ldots, y_l) dy_1, \ldots, dy_l \quad (11)$$

This solution can be approximated by stochastic sampling in that equation (9c) is analogously applied. In this case, this means that the neural network together with the technical system—or its model—are operated for a number of time cycles and that a plurality of time series of y and u are registered. The averaging of the gradients formed with these time series then leads to the values that are employed for the training. On a case-by-case basis, however, it can be beneficial for this purpose to fashion the costs function such that high weightings at individual neurons are punished, i.e. cause high costs, or the number and strength of the control actions of the network are considered in order to be able to avoid infinitely strong control actions. With the above condition for $u_t$, $$\frac{\partial E(\cos t)}{\partial w} \propto \sum_{l=2}^{T} \int \gamma^{l-1} C(y_l, u_1) \times \left[ \sum_{m=1}^{l} \frac{\partial NNW(y_m)}{\partial w} (u_m - NNW(y_m)) \right] P(y_1, \ldots y_l, u_1, \ldots, u_{l-1}) dy_1, \ldots, dy_l, du_1, \ldots du \quad (12)$$

is the gradient for the anticipated costs. By analogous application of (9c), this simplifies to $$\frac{\partial E(\cos t)}{\partial w} \propto \sum_{l=1}^{T} \sum_{s=1}^{S} \int \gamma^{l-1}(y_{l,s}, u_{l,s}) \times \left[ \sum_{m=1}^{l} \frac{\partial NNW(y_{m,s})}{\partial w} (u_{m,s} - NNW(y_{m,s})) \right] \quad (13)$$

wherein T is the number of time units per time series, S is the number of time series, $\gamma \leq 1$ is the decremental factor for future values of the time series, and NNW is the value generated by the neural network.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for training a computerized neural network with a non-deterministic behavior of a technical system, said computerized neural network having neurons with respective weightings associated therewith, comprising the steps of:
   (a) emitting a signal representing at least one manipulated variable from the neural network to the technical system and thereby generating, in said technical system, at least one controlled variable from the manipulated variable supplied from the computerized neural network, and supplying said controlled variable to the computerized neural network as an input quantity;
   (b) superimposing the manipulated variable with a noise signal representing noise having a known noise distribution before supplying said manipulated variable to the technical system;
   (c) producing further signals as inputs to said computerized neural network and setting weightings for said further signals serving inputs to the computerized neural network as a reaction to the controlled variable modified by the superimposed noise depending on a cost function which identifies whether a change in the weighting for a neuron set according to a training procedure has effected an improvement of the controlled variable relative to a reference behavior of the technical system and promoting weighting settings by the cost function which effect such an improvement.

2. A method as claimed in claim 1, comprising the additional step of evaluating the weighting settings by the cost function and identifying whether said change in the weighting of a neuron according to a training procedure has effected a deterioration of the controlled variable relative to said reference behavior of the technical system and attenuating weighting settings by the cost function which effect such a deterioration.

3. A method as claimed in claim 1 wherein step (c) comprises setting said weightings for said signals serving as inputs for said computerized neural network as a reaction to the controlled variable modified by the impressed noise by randomly initializing the weightings by executing step (a) for a plurality of time cycles and logging both the controlled variables and the manipulated variables in the form of respective time series;
   (ii) setting the weightings according to a known training procedure and determining a gradient of the change in weighting for a neuron for each value of the time series dependent on the manipulated variable and on the known noise; and
   (iii) multiply repeating step (ii) and determining whether an improvement in the controlled variable relative to said reference behavior has occurred after each repetition of step (ii).

4. A method as claimed in claim 3, logging a plurality of said time series and setting the weightings for one of said time series having arithmetic averages of the logged time series as discrete values.

5. A method as claimed in claim 4, wherein step (1) comprises logging said controlled variables and said manipulated variables as a time series with the form:

$$y_t = f(y_{t-1}, u_{t-1})$$

$$u_t = NNW(y_t) + \epsilon_t$$

wherein y represents a controlled variable and u represents a manipulated variable and t represents time and, as a subscript, represents chronological position in said time series, with $y_t, \epsilon_t \in R^{Dy}$ and $NNW(y_t)$ is the value generated by the computerized neural network when supplied with v. as said controlled variable, and setting the weightings at the neurons are as follows:

$$\frac{\partial E(\cos t)}{\partial w} \propto \sum_{l=1}^{T} \sum_{s=1}^{S} \int \gamma^{l-1}(y_{l,s}, u_{l,s}) \times \left[ \sum_{m=1}^{l} \frac{\partial [NN_w] NNW(y_{m,s})}{\partial w} (u_{m,s} - [NN_w] \underline{NNW}(y_{m,s})) \right]$$

wherein T is the plurality of time units per time series, S is the plurality of time series, and $\gamma \leq 1$ is a decremental factor for future values of the time series.

6. A method as claimed in claim 1 wherein step (b) comprises superimposing a Gaussian distribution as the known noise distribution.

7. A method as claimed in claim 1 wherein step (b) comprises superimposing the controlled variable with noise having a known noise distribution of the form $$u_t = NNW(y_t) + \delta_t$$

wherein y represents a controlled variable and u represents a manipulated variable and t represents time and, as a subscript, represents chronological position in said time series. With $\delta_t \in R^{Dz}$.

* * * * *